United States Patent
Palmer (10) Patent No.: US 8,302,630 B2
(45) Date of Patent: Nov. 6, 2012

(54) GATE VALVE WITH EQUALIZER PORT

(75) Inventor: Michael J. Palmer, Big Sandy, TX (US)

(73) Assignee: Thunder Rose Enterprises, Inc., Dallas, TX (US)

( * ) Notice: Subject to any disclaimer, the term of this patent is extended or adjusted under 35 U.S.C. 154(b) by 1057 days.

(21) Appl. No.: 12/102,168

(22) Filed: Apr. 14, 2008

(65) Prior Publication Data

US 2009/0256099 A1 Oct. 15, 2009

(51) Int. Cl.
*F16K 3/18* (2006.01)

(52) U.S. Cl. ......... 137/630.12; 137/599.16; 137/601.12; 137/625.12; 137/625.42; 137/629

(58) Field of Classification Search ............. 137/599.16, 137/601.12, 601.15, 625.12, 629, 630.12, 137/625.42
See application file for complete search history.

(56) References Cited

U.S. PATENT DOCUMENTS

| | | | |
|---|---|---|---|
| 588,430 A | | 8/1897 | Hirt |
| 723,803 A | * | 3/1903 | Abeling .................. 137/630.12 |
| 745,649 A | | 12/1903 | McWane |
| 745,774 A | | 12/1903 | Brady |
| 854,523 A | | 5/1907 | Noel |
| 994,587 A | * | 6/1911 | Hartzell .................. 137/630.12 |
| 1,020,159 A | * | 3/1912 | Price ........................ 137/630.12 |
| 1,549,609 A | | 8/1925 | Redding |
| 1,932,471 A | | 10/1933 | McKellar |
| 3,463,193 A | * | 8/1969 | Yost .......................... 137/625.11 |
| 3,621,878 A | * | 11/1971 | Smith .......................... 137/595 |
| 3,658,087 A | * | 4/1972 | Nelson ...................... 137/454.6 |
| 4,150,684 A | * | 4/1979 | Kervin ........................ 137/613 |
| 4,177,833 A | | 12/1979 | Morrison |
| 4,480,659 A | | 11/1984 | Peacock |
| 4,678,008 A | | 7/1987 | Gyongyossy |
| 4,779,649 A | | 10/1988 | Balter |
| 5,101,861 A | * | 4/1992 | Deville et al. ............ 137/630.12 |
| 5,370,155 A | | 12/1994 | Gyongyossy |

FOREIGN PATENT DOCUMENTS

| | | |
|---|---|---|
| DE | 2546024 | 4/1977 |
| JP | 47026011 | 11/1972 |
| JP | H0468262 | 6/1992 |
| JP | H0729366 | 6/1995 |
| JP | 200132951 | 2/2001 |
| LU | 33410 | 2/1955 |

OTHER PUBLICATIONS

Examination Report for New Zealand Application No. 588356 received May 29, 2012, 2 pgs.
Document in English relied on for Examination Report for Chinese Application No. 200980000050.7, which includes International Search Report for International Application No. PCT/US2009/039998 mailed May 29, 2009, 1 pg.

(Continued)

*Primary Examiner* — Craig Schneider
*Assistant Examiner* — Craig J Price
(74) *Attorney, Agent, or Firm* — Hubbard Law PLLC (57) ABSTRACT

A gate valve has a gate movable between open and closed positions within a valve body, and walls in the gate defining an equalizer port between opposite sides of the gate. The equalizer port is adapted and arranged to be shiftable by actuation of the gate between closed and opened positions and between opened and closed positions.

23 Claims, 12 Drawing Sheets

OTHER PUBLICATIONS

Documents in English relied on for Examination Report for Chinese Application No. 200980000050.7, which includes International Preliminary Report on Patentability, dated Oct. 19, 2010, 1 pg, and Written Opinion of the International Searching Authority for International Appl. No. PCT/US2009/039998, 9 pgs.

Translation of Notice of Preliminary Rejection for Korean Application No. 10-2010-7025473 dated Jul. 12, 2012, 3 pgs.

European Patent Office Communication, Supplementary European Search Report, Annex to the European Search Report on European Patent Application No. EP 09703089.4, and Form 1507, dated Apr. 26, 2012 (6 pages).

DE 2546024 published Apr. 21, 1977, machine-generated translation, 5 pgs.

Unofficial translation of Notice of Rejection for Japanese Application No. 2011-505097, received Sep. 7, 2012, 3 pgs.

\* cited by examiner

GATE VALVE WITH EQUALIZER PORT

FIELD OF THE INVENTION

The present invention relates in general to fluid-control valves. More specifically, but without restriction to the particular use which is shown and described, this invention relates to an equalizing device contained within a gate valve.

BACKGROUND OF THE INVENTION

A gate valve is a type of fluid-control valve that opens by lifting a round or rectangular gate or wedge out of the path of the fluid. A feature common to all types of gate valves is that the sealing surfaces between the gate and seats are planar. The gate faces can form a wedge shape or they can be parallel. Gate valves are sometimes used for regulating flow, but many are not suited for that purpose, having been designed to be fully opened or closed. When fully open, the typical gate valve has no obstruction in the flow path, resulting in very low friction loss.

Gate valves are characterized as having either a rising or a nonrising stem. Rising stems provide a visual indication of valve position. Nonrising stems are used where vertical space is limited or underground.

The bonnet provides leak-proof closure for the valve body. A bolted bonnet is used for larger valves and higher pressure applications.

Gate valves normally have flanged ends which are drilled according to pipeline compatible flange dimensional standards. Cast iron, cast carbon steel, gun metal, stainless steel, alloy steels, and forged steels are different materials from which gate valves are constructed.

A well-known draw back to gate valves is that in large-size, high pressure applications (defined herein as applications where the valve is greater than four inches in size and differential pressure on opposite sides of the gate is in excess of 5,000 psi), there is so much force on the gate that it is hard or impossible to open due to friction between the gate and its seal. Even where the gate is openable under such pressure, the friction between the gate and its seal, the force required on the actuator, and the blasting action of the initial equalization flow across the cracked gate, singly or combined may be highly destructive to the valve.

The conventional solution to the problem is an external equalizing conduit between the two sides of the valve, with a small needle valve or the like manually-openable to equalize the pressures on the gate prior to it being opened. This solution, however, is highly dangerous to the operator due to a tendency of the needle valves to violently fail when operated under pressure. Thus there exists a need for a safe and effective means to equalize the pressures on opposite sides of a gate valve in high pressure applications.

SUMMARY OF THE INVENTION

The gate valve of the present invention has a gate with an internal equalizing port.

BRIEF DESCRIPTION OF DRAWINGS

A more complete understanding of the invention and its advantages will be apparent from the Detailed Description taken in conjunction with the accompanying Drawings, in which.

DETAILED DESCRIPTION

Referring initially to FIGS. 1-6G, where like numerals indicate like and corresponding elements, a gate valve 10 has a gate 12 having internal walls defining a main gate passageway 14 and movable between opened and closed positions within a valve body 16. In the opened position the main gate passageway 14 is aligned with walls defining main passageways 18,20 in the valve body 16 on opposite sides of the gate 12, to enable flow through the valve, and where in the closed position (FIGS. 1-3) external sealing faces 22,24 of the gate are aligned with the main passageways 18,20 in the valve body 16, to prevent flow through the valve in cooperation with seals 26,28 between the gate 12 and the valve body 16.

Figure 1:
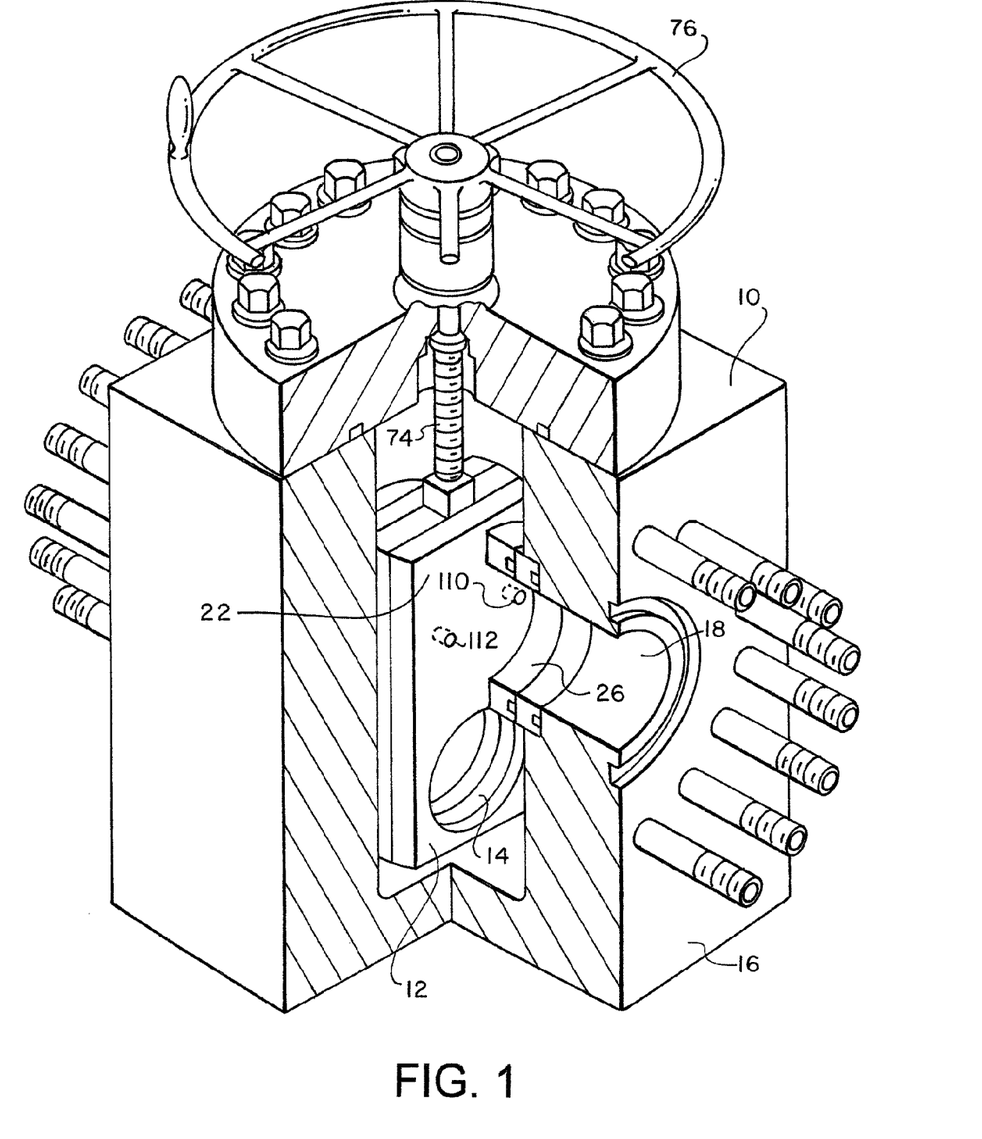
FIG. 1 is a partially broken-away perspective view of the gate valve of the present invention.
Figure 2:
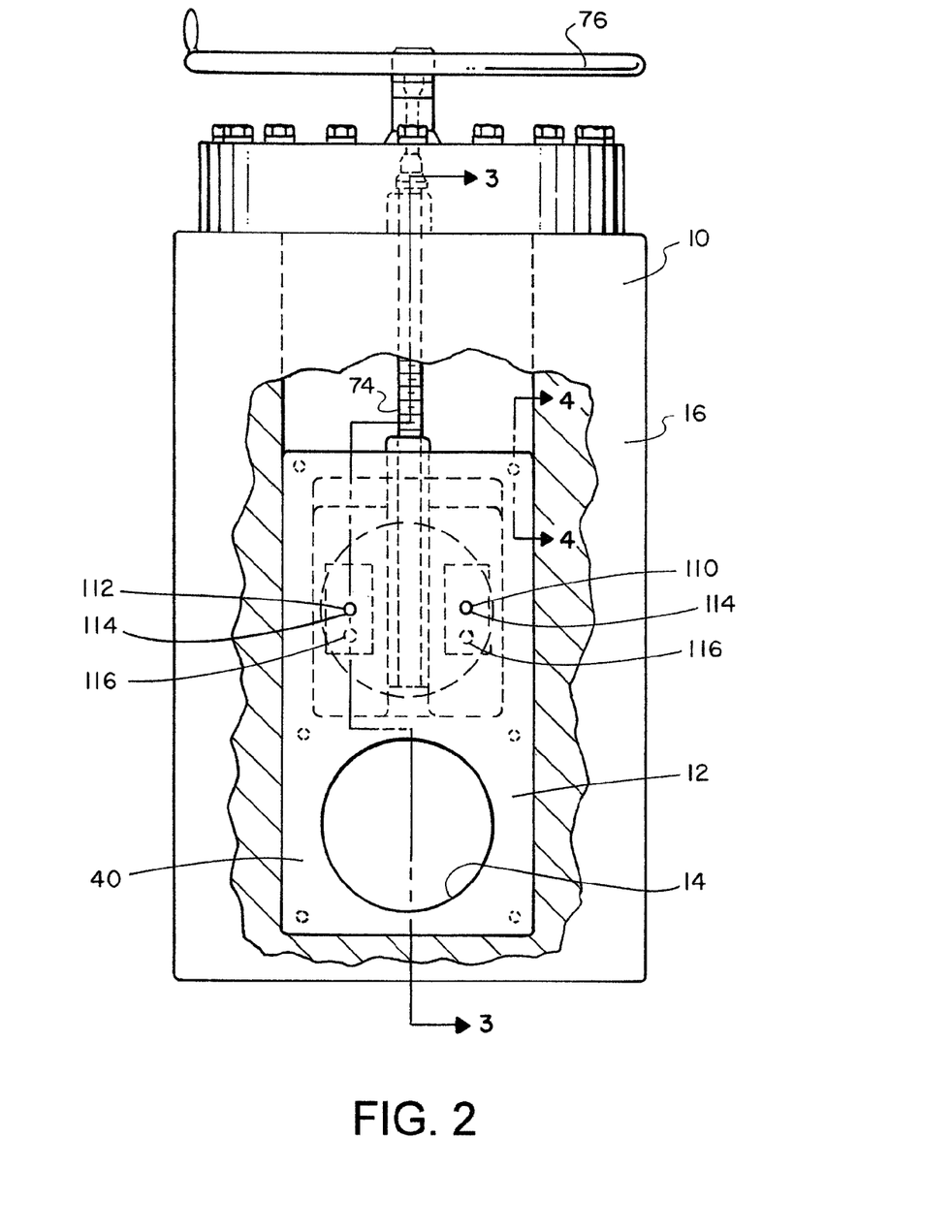
FIG. 2 is a partially broken-away side view of the valve.
Figure 3:
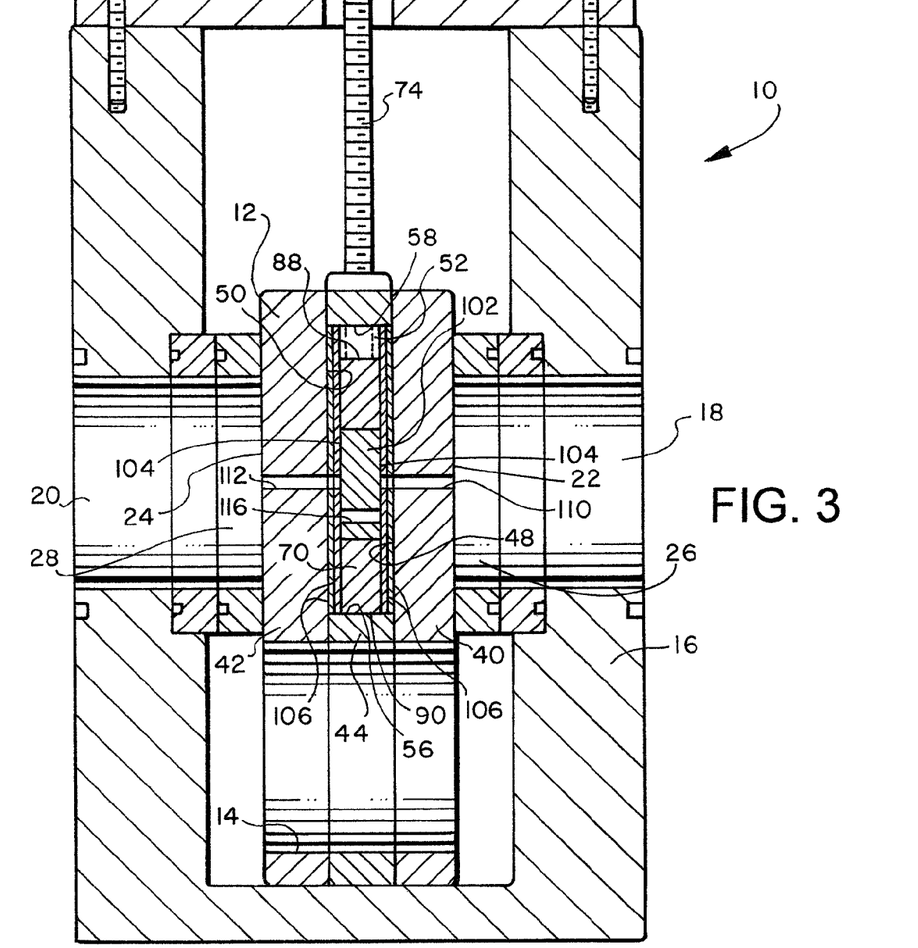
FIG. 3 a sectional view taken along lines 3-3 of FIG. 2.
Figure 4:
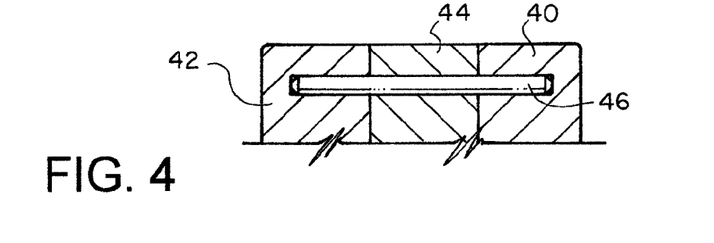
FIG. 4 is a sectional view taken along lines 4-4 of FIG. 2.
Figure 5:
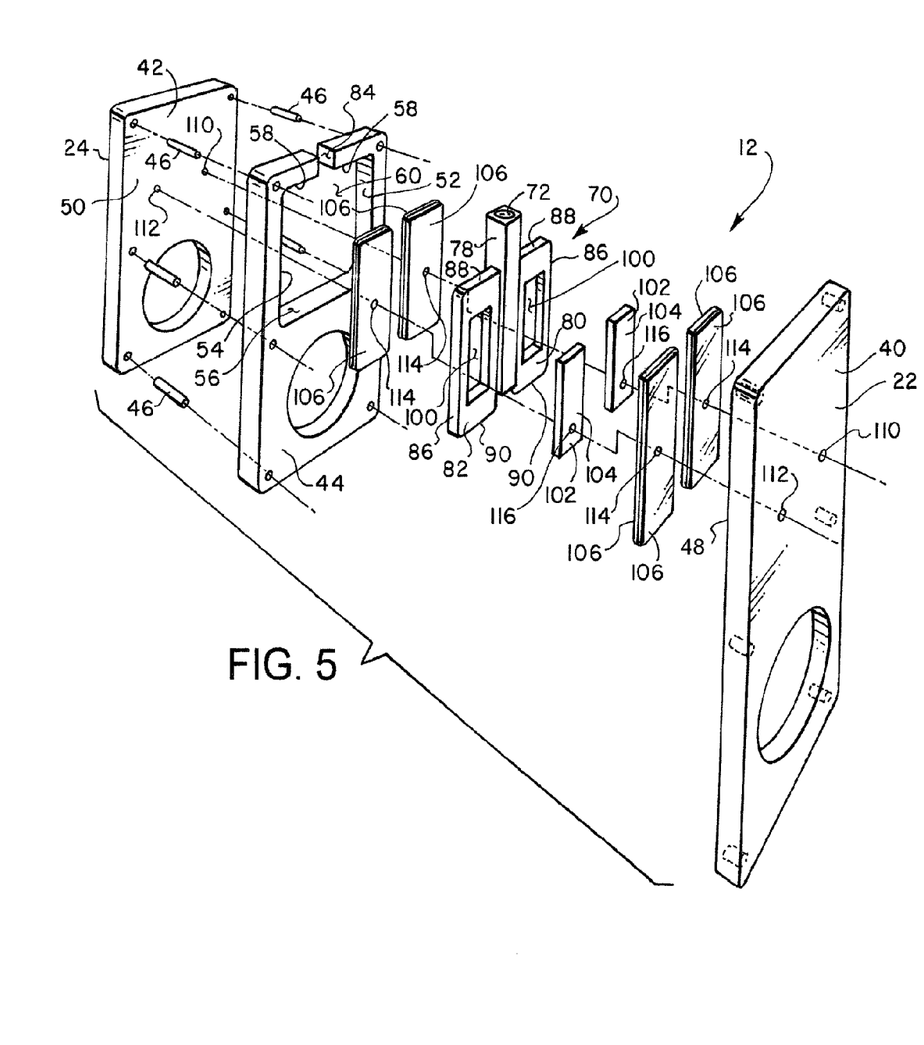
FIG. 5 is an exploded view of the gate.

The gate 12 is formed of two outer layers 40,42 and a middle layer 44, with the outer and middle layers joined by fastener pins 46. The external sealing faces 22,24 of the gate 12 are on the outer layers, and the main gate passageway 14 internal walls are aligned within the outer and middle layers 40,42,44.

Each outer layer 40,42 has an internal face 48,50 opposing the internal face of the other outer layer. The middle layer 44 has opposing internal side faces 52,54 joined to opposing internal end faces 56,58, the internal faces 52,54,56,58 of the outer and middle layers 40,42,44 together forming a cavity 60 within the gate 12 opposite the external sealing faces 22,24 of the gate 12.

A carrier 70 within the cavity 60 is movable between opening and closing positions and is connected for linear actuation by way of female threads 72 within the carrier 70 to a threaded rod 74 extending to a handle 76 outside the valve 10. The carrier 70 is formed of a central section 78 and two flank sections 80, 82 joined to opposite sides of the central section 78. The female threads 72 are formed in the central section 78, and with the central section 78 extends through a gap 84 in one of the middle layer internal end faces 58.

The flank sections 80,82 each has a side surface 86, with the side surfaces 86 spaced to closely interfit with adjacent internal side faces 52,54 of the middle layer 44 for sliding linear relative movement within the cavity 60. In addition, the flank sections 80,82 each has two opposite end surfaces 88,90. The end surfaces 88,90 on each flank section 80,82 have a linear distance between them less than a linear distance between the internal end faces 56,58 of the middle layer 44, such that the carrier 70 has a range of linear travel within the cavity 60 during linear actuation between the opening and closing positions. One end surface 88 contacts one middle layer internal end face 58 in the opening position, and the other end surface 90 contacts the other middle layer internal end face 56 in the closing position. In this manner, the flank sections end surfaces 88,90 in contact with the respective middle layer internal end faces 56,58 are operative to move the gate 12 between the opened and closed positions.

The flank sections 80,82 each have internal walls forming equalizer cavities 100 open in the directions of the internal faces 48,50 of the gate outer layers 40,42. Carrier 70 abuts without being affixed to equalizer gate 102. Equalizer gates 102 within the equalizer cavities 100 are dimensioned for closely-interfitting, floating engagement with the equalizer cavities 100. Each equalizer gate 102 has two opposite sealing surfaces 104 facing the directions of the internal faces 48,50 of the gate outer layers 40,42.

Two seal plates 106 are located between each sealing surface 104 of each equalizer gate 102 and its respective internal face 48,50 of the gate outer layers 40,42. Seal plates 106 are formed of a sealing material, such as Teflon®.

Walls in the outer layers 40,42 of the gate 12 define two spaced gate equalizer ports 110,112 between the opposite external sealing faces 22,24 of the gate 12. The gate equalizer ports 110,112 extend from the external sealing face 22,24 of each outer layer 40,42 to the cavity 60 between the outer layers 40,42. Walls in the seal plates 106 define seal equalizer ports 114 in the seal plates 106 aligned with the gate equalizer ports 110,112. Walls in the equalizer gates 102 define a shiftable internal equalizer port 116 in each equalizer gate 102. Equalizer gate 102 is movable linearly between a closed and open position while remaining closely interfitting with the opposing internal side faces of the interior cavity without the interior cavity changing dimensions. The internal equalizer ports 116 are dimensioned and arranged to be opened by being aligned with the gate equalizer ports 110,112 and seal equalizer ports 114 when the carrier 70 is in the opening position and to be closed by being shifted out of alignment with the gate equalizer ports 110,112 and seal equalizer ports 114 when the carrier 70 is in the closing position.

Figure 6A:
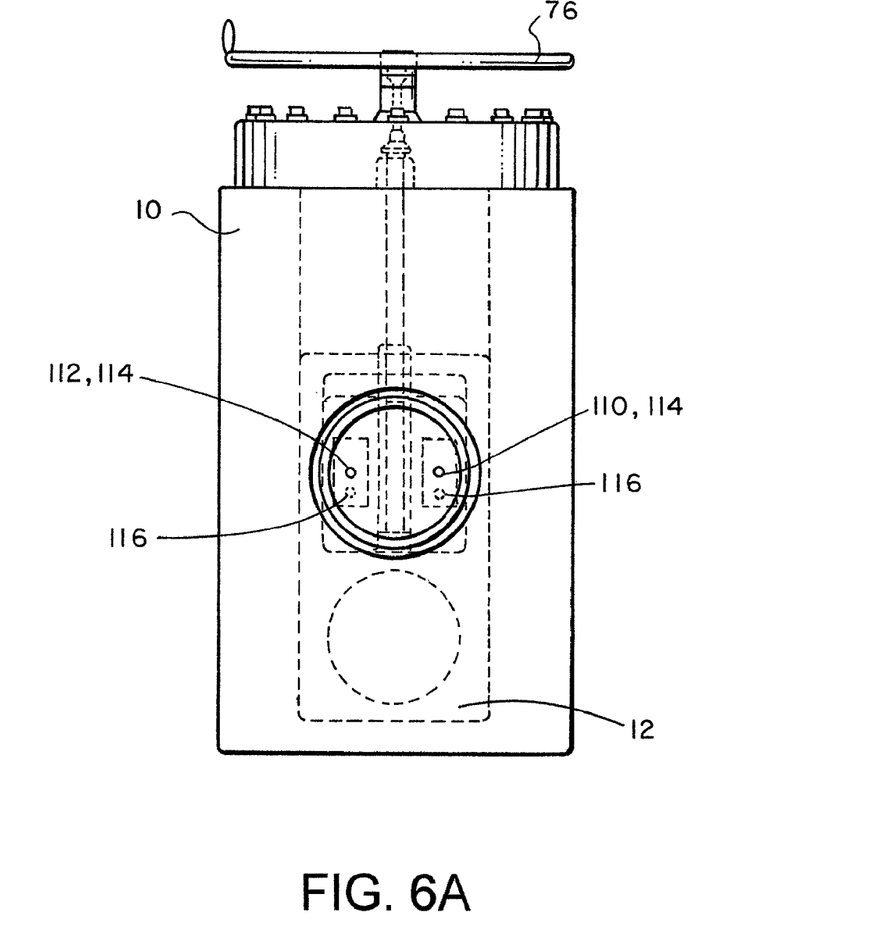
FIGS. 6A-6G are sequential views of the opening and closing of the valve.

In operation, as shown in FIGS. 6A through 6G, opening and closing of the equalizer ports 110,112,114,116 is automatically sequenced by operation of the handle 76 in actuating the gate 12. In FIG. 6A, valve 10 is closed, gate 12 is in the closed position, and carrier 70 is in the closing position. Internal equalizer ports 116 are out of alignment with gate equalizer ports 110,112 and seal equalizer ports 114, which allows the equalizer port to be closed against differential pressure across the valve. The floating engagement of equalizer gates 102 in cavities 100 allows differential pressure to push equalizer gates 102 against seal plates 106 to enable sealing.

Figure 6B:
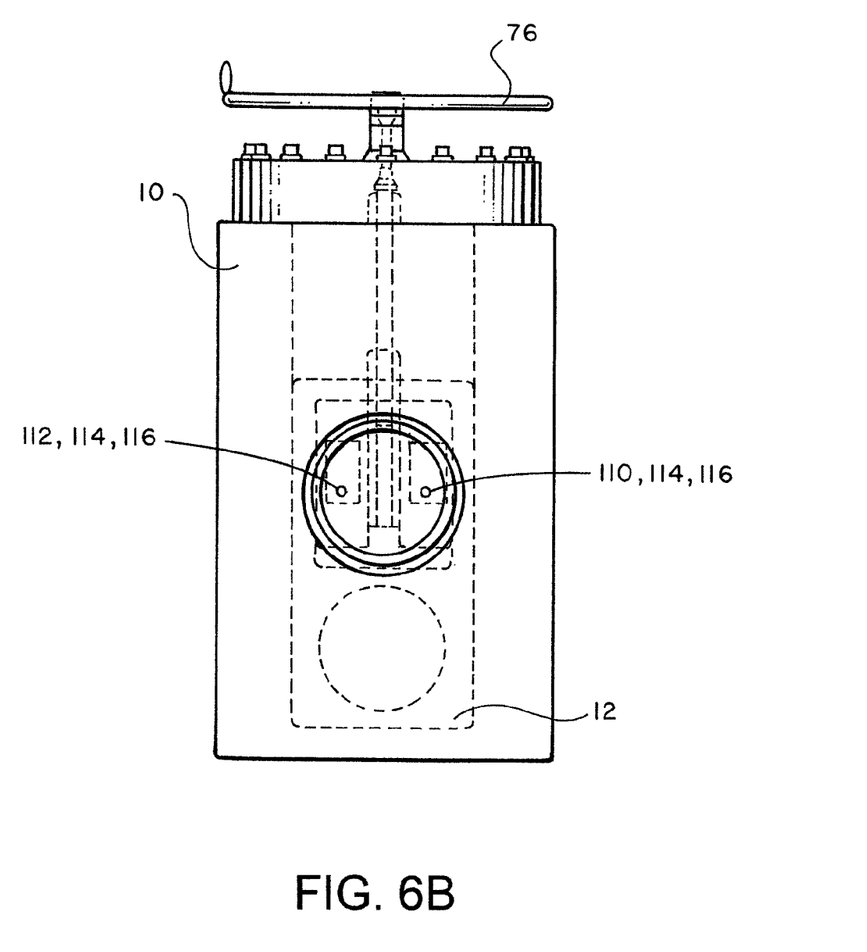

In FIG. 6B, the handle 76 has been turned, raising carrier 70 to the opening position where the flank section end surfaces abut the internal end surfaces of the gate layer middle layer. Gate 12 has not yet moved. This movement of carrier 70 brings ports 110,112,114,116 into alignment, opening the equalizer port and equalizing pressure across the valve. Even where the differential pressure is high, the force required to open the equalizer ports is minimal because of the small surface areas involved. In the event of damage due to repeated actuation of the equalizer ports in the presence of flow and friction, the damage is readily and inexpensively repaired by the replacement of the inexpensive Teflon® seal plates.

Figure 6C:
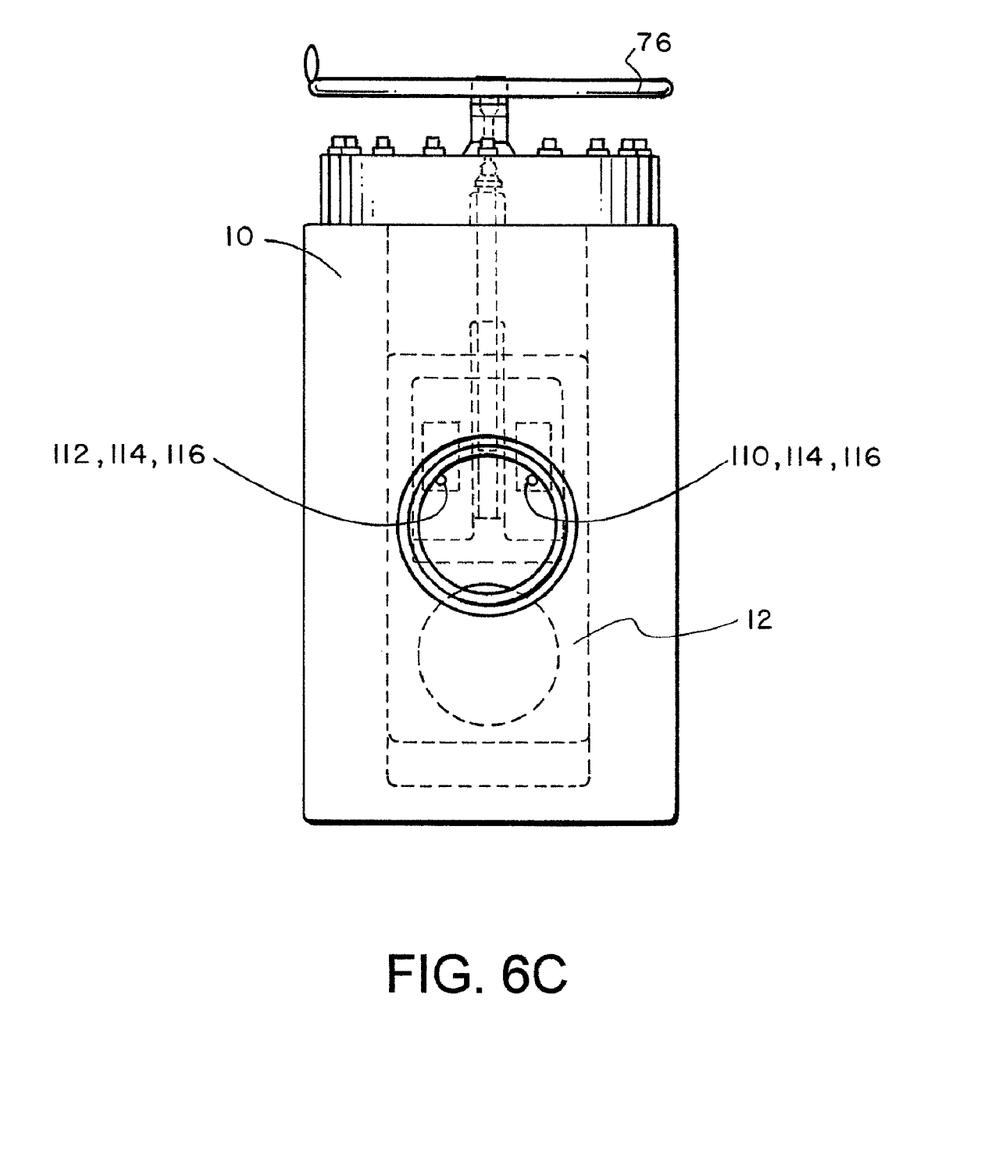
Figure 6D:
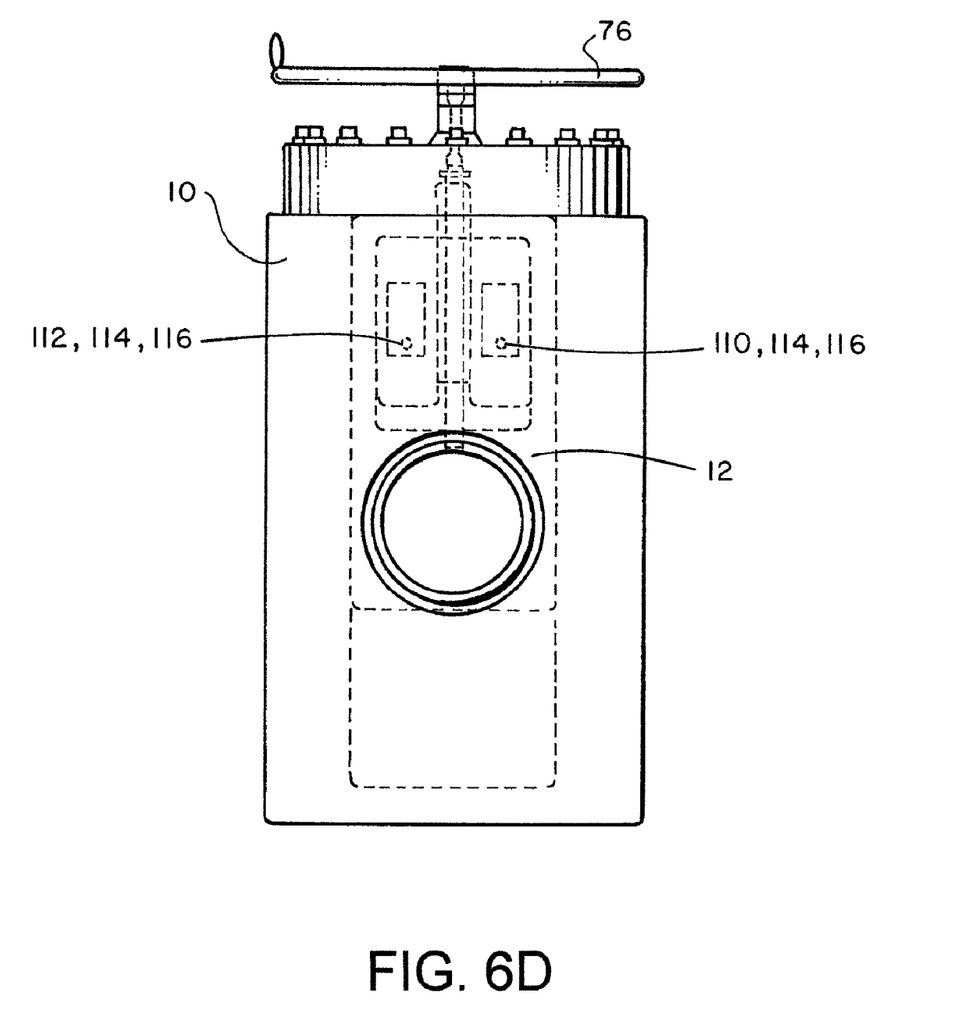

In FIG. 6C, the gate 12 has been raised by the carrier 70 to the point where the main passageway is cracked open. Because pressure across the valve has already been equalized, minimal force is required to move the gate and cracking the valve results in no damaging flow. In FIG. 6D, the valve is fully open, with gate 12 in the open position. Carrier 70 is still in the opening position.

Figure 6E:
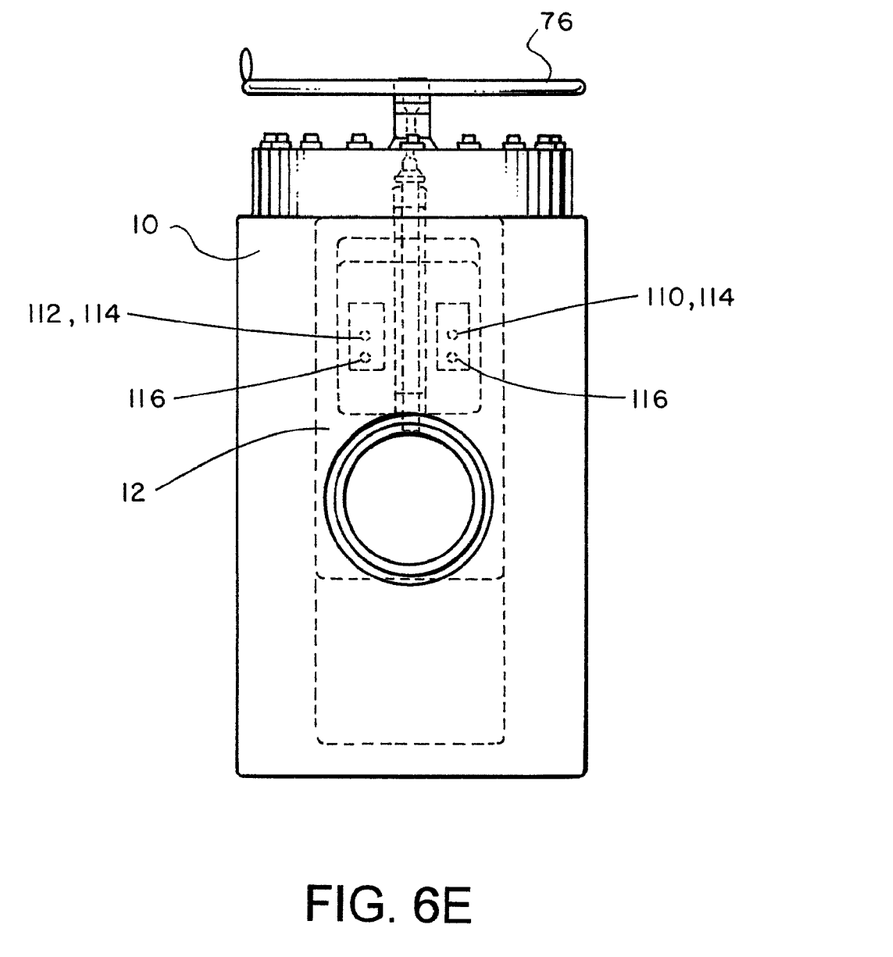
Figure 6F:
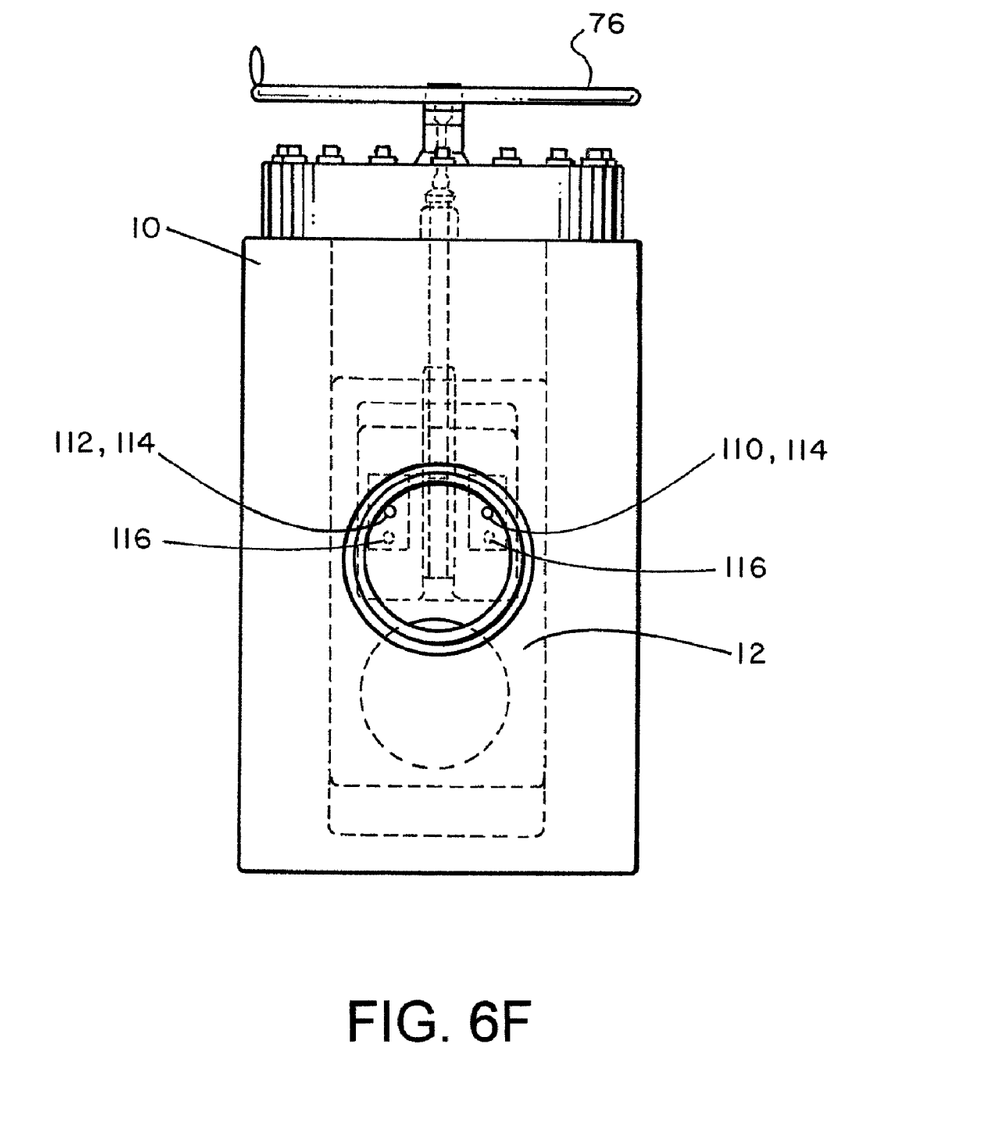
Figure 6G:
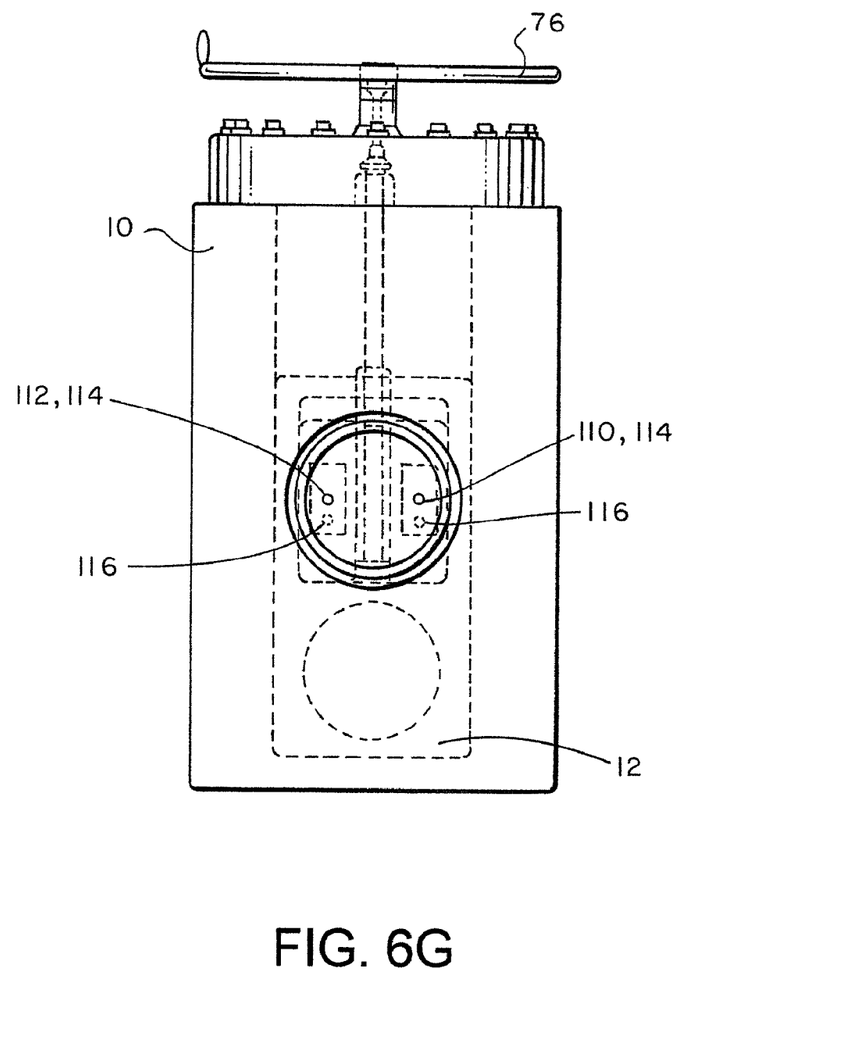

FIGS. 6E through 6G illustrate the closing sequence. Upon initial rotation of handle 76, carrier 70 moves to the closing position shown in FIG. 6E. Equalizer ports 110,112,114,116 shift out of alignment to close the equalizer port. Gate 12 has not yet moved. In FIG. 6F, the valve is partially closed, and in FIG. 6G, the valve is fully closed (as in FIG. 6A).

Figure 7:
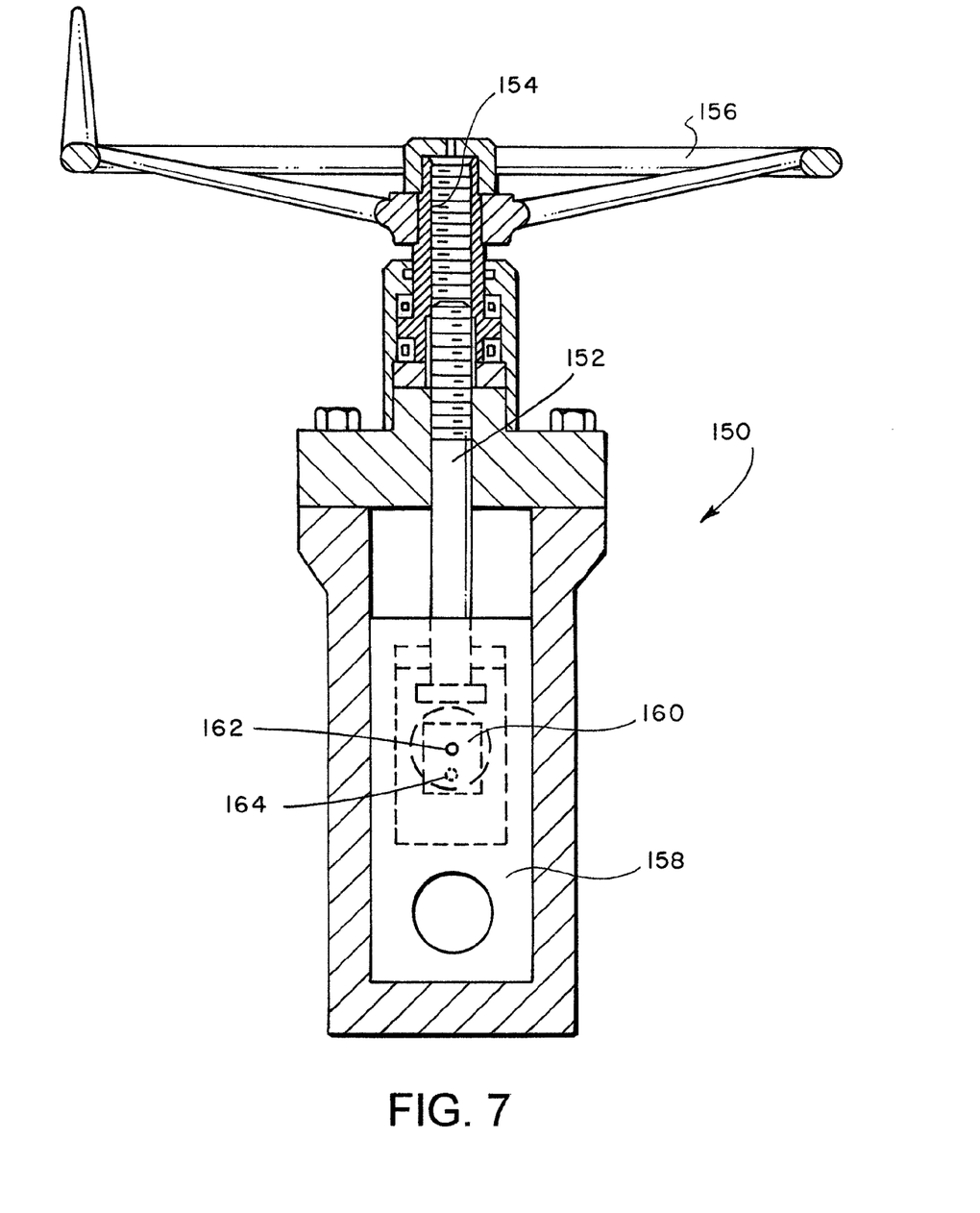
FIG. 7 is a rising stem type valve with an alternate form of an equalizer gate.

FIG. 7 illustrates an alternate embodiment where valve 150 is a rising stem valve. In a rising stem valve, the stem 152 is pulled into internal threads 154 of handle 156. Unlike in valve 10, stem 152 does not rotate with respect to gate 158. This eliminates the need to accommodate the passage of the stem through the carrier, which required that carrier 70 be configured as two flank sections 80,82 and a central section 78, with an equalizer gate 102 in each flank section. In the valve of FIG. 7, a simpler single equalizer gate 160 is utilized, with the equalizer ports 162,164 otherwise configured in similar fashion to those of valve 10.

It will be understood that each of the elements described above, or two or more together, may also find a useful application in other types of constructions differing from the type described above While the invention has been illustrated and described as embodied in particular gate valves, it is not intended to be limited to the details shown, since it will be understood that various omissions, modifications, substitutions and changes in the forms and details of the devices illustrated and in their operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A gate valve, comprising:
   a gate movable between open and closed positions within a valve body; and
   walls in the gate defining an equalizer port between opposite external sealing faces of the gate,
      with the equalizer port adapted and arranged to be shiftable by actuation of the gate between closed and opened positions and between opened and closed positions,
      with internal faces forming a cavity within the gate, and with the equalizer port being in at least one shiftable equalizer gate within the cavity,
      with the equalizer gate being within a carrier within the cavity of the gate, the carrier being movable between opening and closing positions and connected for linear actuation by a handle outside the valve,
      with the carrier having side surfaces spaced to closely interfit with adjacent internal side faces of the cavity within the gate for sliding linear relative movement within the cavity,
      with the carrier having two opposite end surfaces, the end surfaces having a linear distance between them less than a linear distance between internal end faces of the cavity, such that the carrier has a range of linear travel within the cavity during linear actuation between the opening and closing positions, with the one opposite end surface contacting one cavity internal end face in the opening position, and with the other opposite end surface contacting the other cavity internal end face in the closing position, such that the opposite end surfaces of the carrier in contact with the internal end faces of the cavity are operative to move the gate between the opened and closed positions.

2. The gate valve of claim 1 with the carrier having threads connected to a threaded rod extending to the handle.

3. A gate valve, comprising:
   a gate having internal walls defining a main gate passageway and movable between opened and closed positions within a valve body, where in the opened position the main gate passageway is aligned with walls defining main passageways in the valve body on opposite sides of the gate, to enable flow through the valve, and where in the closed position, external sealing faces of the gate are aligned with the main passageways in the valve body, to prevent flow through the valve in cooperation with seals between the gate and the valve body;

the gate being formed of two outer layers and with the external sealing faces of the gate being on the outer layers, and with the main gate passageway internal walls being aligned within the outer layers, walls in the gate outer layers defining a gate equalizer port in each gate outer layer extending to the external sealing face of the gate outer layer;

an internal equalizer port adapted and arranged to be shiftable by actuation of the gate between closed and opened positions and between opened and closed positions;

with internal faces forming a cavity within the gate, and with the internal equalizer port being in at least one shiftable equalizer gate within the cavity;

with the equalizer gate being within a carrier within the cavity of the gate, the carrier being movable between opening and closing positions and connected for linear actuation;

with the carrier having side surfaces spaced to closely interfit with adjacent internal side faces of the cavity within the gate for sliding linear relative movement within the cavity;

with the carrier having two opposite end surfaces, the end surfaces having a linear distance between them less than a linear distance between internal end faces of the cavity, such that the carrier has a range of linear travel within the cavity during linear actuation between the opening and closing positions, with the one end surface of the two opposite end surfaces contacting one cavity internal end face in the opening position, and with the other end surface of the two opposite end surfaces contacting the other cavity internal end face in the closing position, such that the end surfaces of the two opposite end surfaces in contact with the internal end faces of the cavity are operative to move the gate between the opened and closed positions; and the shiftable internal equalizer port in the equalizer gate being dimensioned and arranged to be opened by being aligned with the gate equalizer ports when the carrier is in the opening position and to be closed by being shifted out of alignment with the gate equalizer ports when the carrier is in the closing position.

4. The gate valve of claim 3 with the outer layers joined by fastener pins.

5. The gate valve of claim 3 with each outer layer having an internal face opposing the internal face of the other outer layer, the internal faces of the outer layers together forming the cavity within the gate.

6. The gate valve of claim 3 with the carrier connected for linear actuation by way of a threaded rod that extends outside the valve.

7. The gate valve of claim 3 with the carrier being formed of a central section and two flank sections joined to opposite sides of the central section, with the central section for connection to a threaded rod, and with the central section extending through a gap in the outer layers, and with the carrier having side surfaces being formed on the flank sections.

8. The gate valve of claim 7 with the carrier having end surfaces formed on the flank sections, with each flank section having two opposite end surfaces, and the end surfaces on each flank section having a linear distance between them less than a linear distance between the internal end faces of the cavity.

9. The gate valve of claim 7 with:
the flank sections each having internal walls forming equalizer cavities open in the directions of the internal faces of the gate outer layers;
equalizer gates within the equalizer cavities dimensioned for closely-interfitting, floating engagement with the equalizer cavities; and
walls defining an internal equalizer port within each equalizer gate.

10. The gate valve of claim 9 with:
each equalizer gate having two opposite sealing surfaces facing the directions of the internal faces of the gate outer layers; and
at least one seal plate located between each sealing surface of each equalizer gate and its respective internal face of the gate outer layers.

11. The gate valve of claim 10 with two seal plates located between each sealing surface of each equalizer gate and its respective internal face of the gate outer layers body.

12. A gate valve, comprising:
a gate having internal walls defining a main gate passageway and movable between opened and closed positions within a valve body, where in the opened position the main gate passageway is aligned with walls defining main passageways in the valve body on opposite sides of the gate, to enable flow through the valve, and where in the closed position, external sealing faces of the gate are aligned with the main passageways in the valve body, to prevent flow through the valve in cooperation with seals between the gate and the valve body;

the gate being formed of two outer layers and a middle layer, with the outer and middle layers joined by fastener pins, and with the external sealing faces of the gate being on the outer layers, and with the main gate passageway internal walls being aligned within the outer and middle layers;

each outer layer having an internal face opposing the internal face of the other outer layer, and the middle layer having opposing internal side faces joined to opposing internal end faces, the internal faces of the outer and middle layers together forming a cavity within the gate opposite the external sealing faces of the gate;

a carrier within the cavity movable between opening and closing positions and connected for linear actuation by way of female threads within the carrier to a threaded rod extending to a handle outside the valve;

the carrier being formed of a central section and two flank sections joined to opposite sides of the central section, with the female threads being formed in the central section, and with the central section extending through a gap in one of the middle layer internal end faces;

the flank sections each having a side surface, the side surfaces spaced to closely interfit with adjacent internal side faces of the middle layer for sliding linear relative movement within the cavity;

the flank sections each having two opposite end surfaces, the end surfaces on each flank section having a linear distance between them less than a linear distance between the internal end faces of the middle layer, such that the carrier has a range of linear travel within the cavity during linear actuation between the opening and closing positions, with the one end surface of the two opposite end surfaces contacting one middle layer internal end face in the opening position, and with the other end surface of the two opposite end surfaces contacting the other middle layer internal end face in the closing position, such that the flank sections end surfaces in contact with the respective middle layer internal end faces are operative to move the gate between the opened and closed positions;

the flank sections each having internal walls forming equalizer cavities open in the directions of the internal faces of the gate outer layers;

equalizer gates within the equalizer cavities dimensioned for closely-interfitting, floating engagement with the equalizer cavities;

each equalizer gate having two opposite sealing surfaces facing the directions of the internal faces of the gate outer layers; and two seal plates located between each sealing surface of each equalizer gate and its respective internal face of the gate outer layers;

walls in the outer layers of the gate defining two spaced gate equalizer ports between the opposite external sealing faces of the gate, the gate equalizer ports extending from the external sealing face of each outer layer to the cavity between the outer layers;

walls in the seal plates defining seal equalizer ports in the seal plates aligned with the gate equalizer ports;

walls in the equalizer gates defining a shiftable internal equalizer port in each equalizer gate dimensioned and arranged to be opened by being aligned with the gate equalizer ports and seal equalizer ports when the carrier is in the opening position and to be closed by being shifted out of alignment with the gate equalizer ports and seal equalizer ports when the carrier is in the closing position.

13. An apparatus, comprising:

a gate for opening and closing a fluid passageway, the gate being adapted for linear movement perpendicular to the axis of the fluid passageway when mounted in a valve body;

an interior cavity formed within the gate between parallel, opposing internal side faces;

a plurality of equalizer ports defined in the gate and arranged for enabling communication of fluid from one side of the gate to another side of the gate, each of the equalizer ports having an opening into the interior cavity through one of the internal side faces; and an equalizer gate held between the opposing internal side faces and sealed against the opening of each of the plurality of equalizer ports, the equalizer gate being shiftable in a linear direction parallel to the opposing internal side faces between a closed position preventing fluid flow between the plurality of equalizer ports and an open position permitting fluid below between the plurality of equalizer ports; and a carrier abutting the equalizer gate without being affixed to the equalizer gate, the equalizer gate thereby having a floating engagement within the carrier, the carrier being moveable between first and second positions for shifting the equalizer gate between open and closed positions.

14. The apparatus of claim 13, wherein the equalizer gate has defined through it an equalizer port, the equalizer port being aligned with the plurality of equalizer ports when the equalizer gate is in the open position, thereby permitting flow of fluid to be communicated between opposite sides of the gate.

15. The apparatus of claim 13, wherein the equalizer gate seals against the opposing interior side faces in the open and closed positions, thereby preventing fluid being communicated by the ports from entering the cavity.

16. The apparatus of claim 13, wherein the carrier is connected to a stem for moving the carrier from the first position to the second position.

17. The apparatus of claim 13, wherein, once the carrier is lifted at or beyond the second position the carrier engages an internal surface of the gate for enabling lifting of the gate by continued lifting of the stem.

18. A gate valve, comprising:

a first gate movable linearly between a closed and open positions within a valve body for opening and closing a main gate passageway through the valve,
the first gate having an interior cavity defined by parallel opposing internal side faces and equalizer ports that extend therethrough and into the interior cavity; and an equalizer gate defined by parallel opposing side faces closely interfitting with the opposing internal side faces of the interior cavity,
the equalizer gate movable linearly between a closed and open position while remaining closely interfitting with the opposing internal side faces of the interior cavity without the interior cavity changing dimensions,
the equalizer gate comprising a separate equalizer port extending therethrough,
the separate equalizer port in alignment with the equalizer ports of the first gate when the equalizer gate is in the open position.

19. The gate valve of claim 18 with the equalizer gate retained in a carrier.

20. The gate valve of claim 19 with the carrier being movable between open and closed positions and connected for linear actuation of the first gate.

21. The gate valve of claim 19 with the carrier having a connection outside the valve for actuation of the carrier.

22. The gate valve of claim 19 with the carrier having side surfaces that closely interfit with the internal side faces of the interior cavity to enable sealing of the carrier within the interior cavity while allowing sliding linear relative movement within the interior cavity.

23. The gate valve of claim 19 with the carrier having two opposite end surfaces, the end surfaces having a linear distance between them less than a linear distance between internal end faces of the interior cavity, such that the carrier has a range of linear travel within the interior cavity during linear actuation between the opening and closing positions, with one opposite end surface contacting one cavity internal end face in the opening position, and with the other end surface contacting the other cavity internal end face in the closing position, such that the opposite end surfaces of the carrier in contact with the internal end faces of the interior cavity are operative to move the gate between the opened and closed positions.

\* \* \* \* \*